US010378620B2

(12) United States Patent
Tran et al.

(10) Patent No.: US 10,378,620 B2
(45) Date of Patent: Aug. 13, 2019

(54) DECOUPLER WITH OVERRUNNING AND BELT-START CAPABILITY (71) Applicant: Litens Automotive Partnership, Woodbridge (CA)

(72) Inventors: Hao Q. Tran, North York (CA); Jason R. Desouza-Coelho, Markham (CA); Warren J. Williams, Oakville (CA); Andrew M. Boyes, Aurora (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 482 days.

(21) Appl. No.: 15/110,926

(22) PCT Filed: Jan. 12, 2015

(86) PCT No.: PCT/CA2015/000020
§ 371 (c)(1),
(2) Date: Jul. 11, 2016

(87) PCT Pub. No.: WO2015/103697
PCT Pub. Date: Jul. 16, 2015

(65) Prior Publication Data
US 2016/0333987 A1 Nov. 17, 2016

Related U.S. Application Data (60) Provisional application No. 61/926,936, filed on Jan. 13, 2014, provisional application No. 61/926,250, filed on Jan. 10, 2014.

(51) Int. Cl.
F16D 3/12 (2006.01)
F16H 7/02 (2006.01)
(Continued)

(52) U.S. Cl.
CPC ........... *F16H 7/0827* (2013.01); *B60K 25/02* (2013.01); *F16D 3/12* (2013.01); *F16D 13/76* (2013.01);
(Continued)

(58) Field of Classification Search
CPC .......... F16D 3/12; F16D 13/76; F16D 27/105; F16D 41/206; F16D 47/04; F16H 7/0827; F16H 55/36; F16H 2055/366; B60K 25/02
See application file for complete search history.

(56) References Cited

U.S. PATENT DOCUMENTS 3,019,871 A 2/1962 Sauzedde
3,812,936 A 5/1974 Dane
(Continued)

FOREIGN PATENT DOCUMENTS

CN 1393645 A 1/2003
CN 1856664 A 11/2006
(Continued)

OTHER PUBLICATIONS

Office Action for CN201580004254.3 dated Jun. 5, 2018.
(Continued)

*Primary Examiner* — Richard M Lorence
(74) *Attorney, Agent, or Firm* — Millman IP Inc.

(57) ABSTRACT

In an aspect, a clutched device is provided, including a hub, a pulley and a hub drive clutch. The hub defines an axis and is connectable to a rotatable shaft of a rotary device. The pulley is rotatable relative to the hub and is engageable with an endless drive member. The hub drive clutch is a wrap spring clutch and is controllable to operatively connect the pulley to the hub for driving the hub in a first rotational direction. An isolation spring is provided and operatively connects the hub to the pulley when the hub drives the pulley
(Continued)

in the first rotational direction. Optionally, a pulley overrun clutch is provided and permits the pulley to overrun the hub in the first rotational direction.

13 Claims, 7 Drawing Sheets (51) Int. Cl.
*F16H 7/08* (2006.01)
*B60K 25/02* (2006.01)
*F02B 67/06* (2006.01)
*F16D 13/76* (2006.01)
*F16D 41/20* (2006.01)
*F16D 47/04* (2006.01)
*F16H 55/36* (2006.01)
*F16D 27/105* (2006.01)

(52) U.S. Cl.
CPC ......... *F16D 27/105* (2013.01); *F16D 41/206* (2013.01); *F16D 47/04* (2013.01); *F16H 55/36* (2013.01); *F02B 67/06* (2013.01); *F16H 7/02* (2013.01); *F16H 2055/366* (2013.01)

(56) References Cited

U.S. PATENT DOCUMENTS

| | | | |
|---|---|---|---|
| 3,865,222 A | 2/1975 | Briar |
| 4,570,758 A | 2/1986 | Hendricks |
| 4,867,291 A | 9/1989 | Holman et al. |
| 5,085,306 A | 2/1992 | Beigang |
| 5,275,261 A | 1/1994 | Vranish |
| 5,517,957 A | 5/1996 | Wagner et al. |
| 5,638,931 A | 6/1997 | Kerr |
| 6,083,130 A | 7/2000 | Mevissen et al. |
| 6,582,333 B2 | 6/2003 | Man et al. |
| 6,698,563 B2 | 3/2004 | Handa et al. |
| 6,755,763 B1 | 6/2004 | Goto et al. |
| 6,766,888 B2 | 7/2004 | Yasui et al. |
| 6,832,970 B2 | 12/2004 | Eibler |
| 6,871,735 B2 | 3/2005 | Kawai et al. |
| 6,955,141 B2 | 10/2005 | Santanam et al. |
| 7,114,585 B2 | 10/2006 | Man et al. |
| 7,543,454 B2 | 6/2009 | Harris |
| 7,591,357 B2 | 9/2009 | Antchak et al. |
| 7,618,337 B2 | 11/2009 | Jansen et al. |
| 7,624,852 B2 | 12/2009 | Mevissen et al. |
| 7,654,375 B2 | 2/2010 | Okada et al. |
| 8,166,945 B2 | 5/2012 | Spicer et al. |
| 8,454,463 B2 | 6/2013 | Parsons |
| 8,460,152 B2 | 6/2013 | Parsons et al. |
| 8,534,438 B2 | 9/2013 | Antchak et al. |
| 8,627,935 B2 | 1/2014 | Danciu et al. |
| 2003/0005784 A1 | 1/2003 | Schnelle et al. |
| 2003/0019708 A1 | 1/2003 | Goto et al. |
| 2007/0037644 A1 | 2/2007 | Mevissen et al. |
| 2007/0267264 A1 | 11/2007 | Pederson |
| 2008/0020875 A1 | 1/2008 | Serrels et al. |
| 2008/0045374 A1 | 2/2008 | Weinberg et al. |
| 2008/0276892 A1 | 11/2008 | Doljack |
| 2008/0312014 A1 | 12/2008 | Stief et al. |
| 2009/0212626 A1 | 8/2009 | Snyder et al. |
| 2009/0291794 A1 | 11/2009 | Amanuma |
| 2010/0006500 A1 | 1/2010 | Cantwell et al. |
| 2010/0122882 A1 | 5/2010 | Komorowski et al. |
| 2010/0230227 A1 | 9/2010 | Parsons et al. |
| 2011/0083919 A1 | 4/2011 | Kshatriya |
| 2011/0112742 A1 | 5/2011 | Losano et al. |
| 2011/0315502 A1* | 12/2011 | Antchak ................. F16D 7/022 192/75 |
| 2013/0098727 A1 | 4/2013 | Williams et al. |
| 2013/0118853 A1 | 5/2013 | Champalou et al. |
| 2014/0008175 A1 | 1/2014 | Schneider et al. |

FOREIGN PATENT DOCUMENTS

| | | |
|---|---|---|
| CN | 101326385 A | 12/2008 |
| CN | 102985716 A | 3/2013 |
| DE | 102011085138 A1 | 6/2012 |
| WO | 9316585 A1 | 9/1993 |
| WO | 3104673 A1 | 12/2003 |
| WO | 2009118834 A1 | 10/2009 |
| WO | 2010048732 A1 | 5/2010 |
| WO | 2010054487 A1 | 5/2010 |
| WO | 2010099605 A1 | 9/2010 |
| WO | 2011017811 A1 | 2/2011 |
| WO | 2008150349 A1 | 10/2011 |
| WO | 2012135942 A1 | 10/2012 |
| WO | 2013033825 A1 | 3/2013 |
| WO | 2013152430 | 10/2013 |
| WO | 2014205508 A1 | 12/2014 |

OTHER PUBLICATIONS

Office Action for CN201580004254.3 dated Jun. 5, 2018—English translation.
Office Action for U.S. Appl. No. 15/037,034 dated Aug. 28, 2018.
"Ultracapacitor Assisted Electric Devices for Transportation", Miller et al. (MaxwellTechnologies Inc.), 2003.
International Preliminary Report on Patentability for WO2012135942 dated Jul. 11, 2012.
International Search Report and Written Opinion for PCT/CA2014/000818 dated Feb. 5, 2015.
Isolating Crankshaft Pulley with BAS and ISAF—Power Point Presentation, Litens Automotive Group, Oct. 17, 2013.
Means Industries Mechanical Diode Clutch Info #1(pdf, p. 4)—Bi-Directional Controllable MD, 2001.
Means Industries Mechanical Diode Clutch Info #2, 2001.
Means Industries Mechanical Diode Clutch Info #3, 2001.
Office Action for CN201180054087.5 dated Apr. 27, 2015.
Office Action for CN201180054087.5 dated Apr. 27, 2015—partial translation.
International Search Report for PCT/CA2012/000331 dated Jul. 11, 2012.
International Search Report and Written Opinion for PCT/CA2015/000020 dated Mar. 24, 2015.
Written Opinion for PCT/CA2012/000331 dated Jul. 11, 2012.
Office Action for CN201480062465.8 dated Feb. 5, 2018.
Office Action for CN201480062465.8 dated Feb. 5, 2018—English translation.

* cited by examiner

DECOUPLER WITH OVERRUNNING AND BELT-START CAPABILITY

CROSS-REFERENCE TO RELATED APPLICATIONS

This application claims the benefit of U.S. Provisional Application No. 61/926,250, filed Jan. 10, 2014, and claims the benefit of U.S. Provisional Application No. 61/926,936, filed Jan. 13, 2014, the contents of both of which are incorporated herein by reference in their entirety.

FIELD OF INVENTION

This disclosure relates generally to the field of decouplers for use between an engine crankshaft and a belt or other endless drive member, or between a shaft of an accessory such as an MGU or alternator and the endless drive member.

BACKGROUND OF INVENTION

It is known to provide an decoupler on an engine crankshaft or on a belt-driven accessory, such as an MGU (motor generator unit) or an alternator, that is driven by a belt from the crankshaft of an engine in a vehicle. As is known, the crankshaft undergoes cycles of accelerations and decelerations associated with the firing of the cylinders in the engine. The decoupler permits these accelerations and decelerations to occur with reduced effect on the speed of the belt. A problem with some decouplers is that they do not provide 'decoupling' which permits overrunning of the belt and the pulley relative to the crankshaft of the engine. Some decouplers have been proposed which include powered clutches to provide decoupling and which also permit BAS (belt/alternator start) capability for the engine when desired. However, such decouplers can be complex. It would beneficial to provide a decoupler that at least partially addresses this problem.

SUMMARY

In an aspect, a clutched device is provided, including a hub, a pulley and a hub drive clutch. The hub defines an axis and is connectable to a rotatable shaft of a rotary device. The pulley is rotatable relative to the hub and is engageable with an endless drive member. The hub drive clutch is a wrap spring clutch and is controllable to operatively connect the pulley to the hub for driving the hub in a first rotational direction. An isolation spring is provided and operatively connects the hub to the pulley when the hub drives the pulley in the first rotational direction. Optionally, a pulley overrun clutch is provided and permits the pulley to overrun the hub in the first rotational direction.

BRIEF DESCRIPTION OF THE DRAWINGS

The foregoing and other aspects of the disclosure will be more readily appreciated by reference to the accompanying drawings, wherein.

DETAILED DESCRIPTION OF EMBODIMENTS

Figure 1:
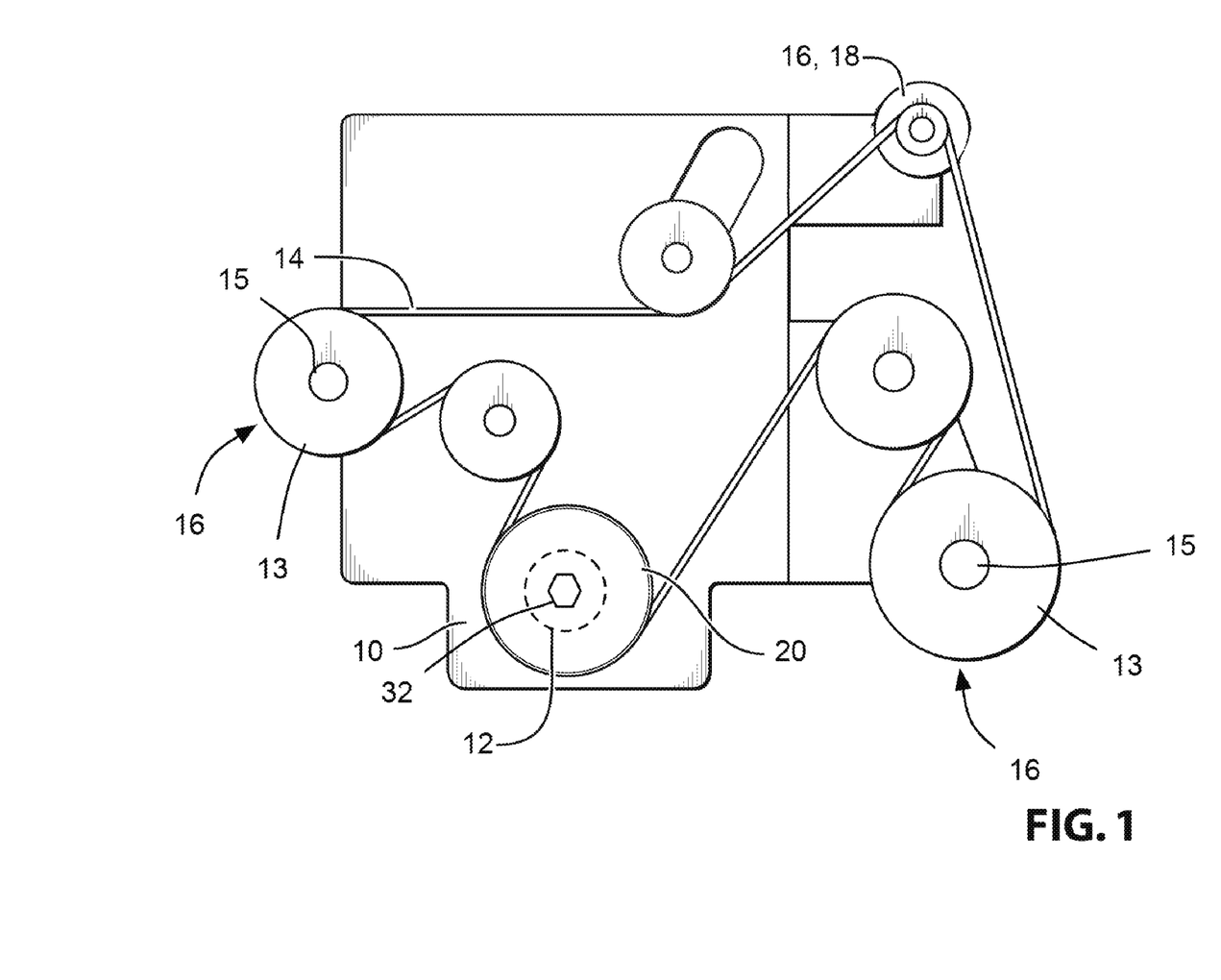
FIG. 1 is an elevation view of an engine with a belt drive with a clutched device in accordance with an embodiment of the present invention.

Reference is made to FIG. 1, which shows an engine 10 for a vehicle. The engine 10 includes a crankshaft 12 which drives an endless drive member 14, which may be referred to as a belt 14 for convenience, with the understanding that any other suitable endless drive member could instead be used. Via the belt 14, the engine 10 drives a plurality of accessories 16, such as an MGU (motor-generator unit) 18. Each accessory 16 includes an input drive shaft 15 with a pulley 13 thereon, which is driven by the belt 14. The term 'pulley' is used here for convenience, however, it will be understood that any suitable torque transfer member may be used depending on what the endless drive member 14 is.

A clutched device 20 is shown on the engine crankshaft 12 and acts to control torque transfer between the crankshaft 12 and the belt 14. The clutched device 20 may be referred to as a decoupler 20, because it provides the capability to at least somewhat isolate the belt 14 from torsional vibrations in the crankshaft 12 and to provide overrunning capability at the belt 14, permitting the belt 14 to briefly overrun the crankshaft 12 as needed. The decoupler 12, in some embodiments, also provides the capability for the belt 14 to drive the crankshaft 12 so as to provide boost or BAS (belt/alternator start) capability to the engine 10.

Figure 2:
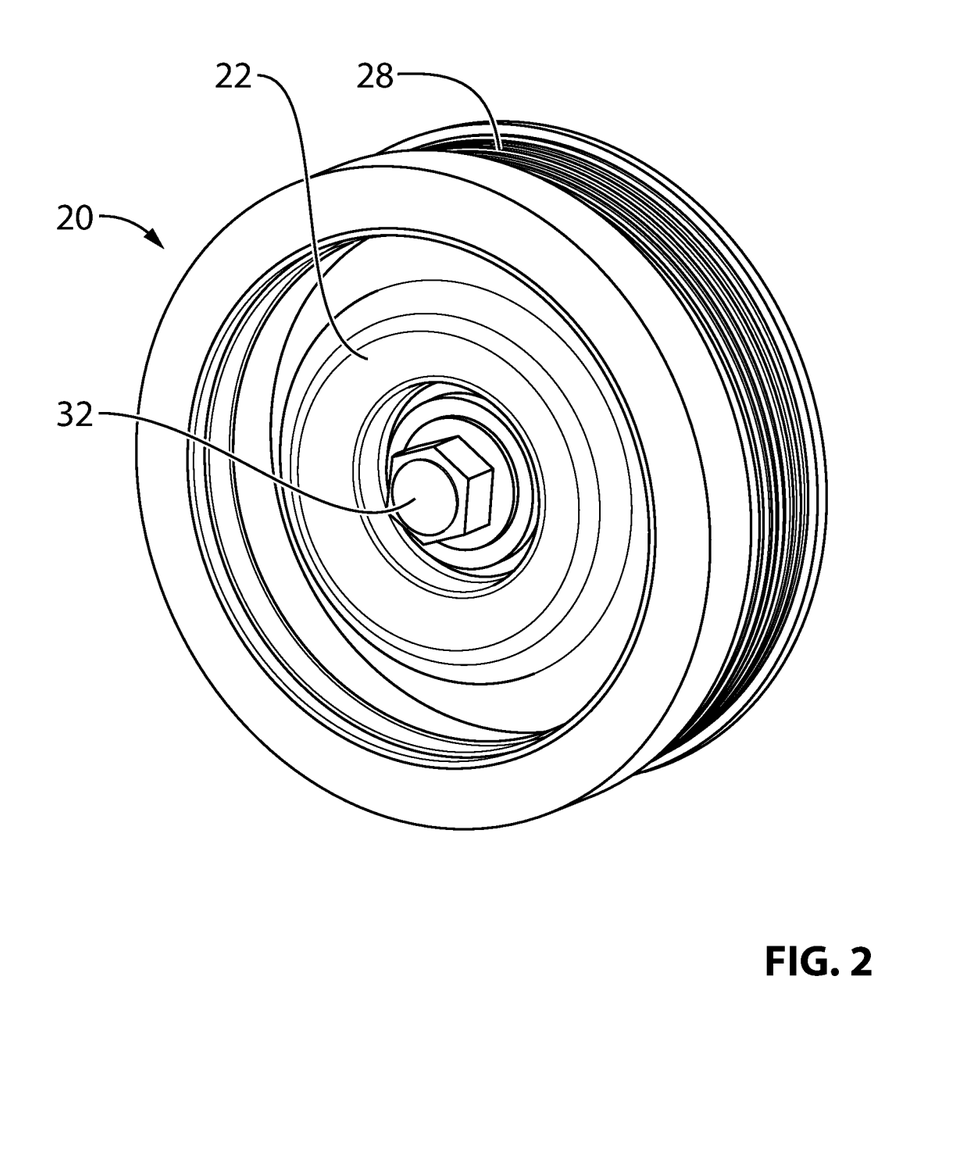
FIG. 2 is a magnified perspective view of the clutched device shown in FIG. 1.
Figure 3A:
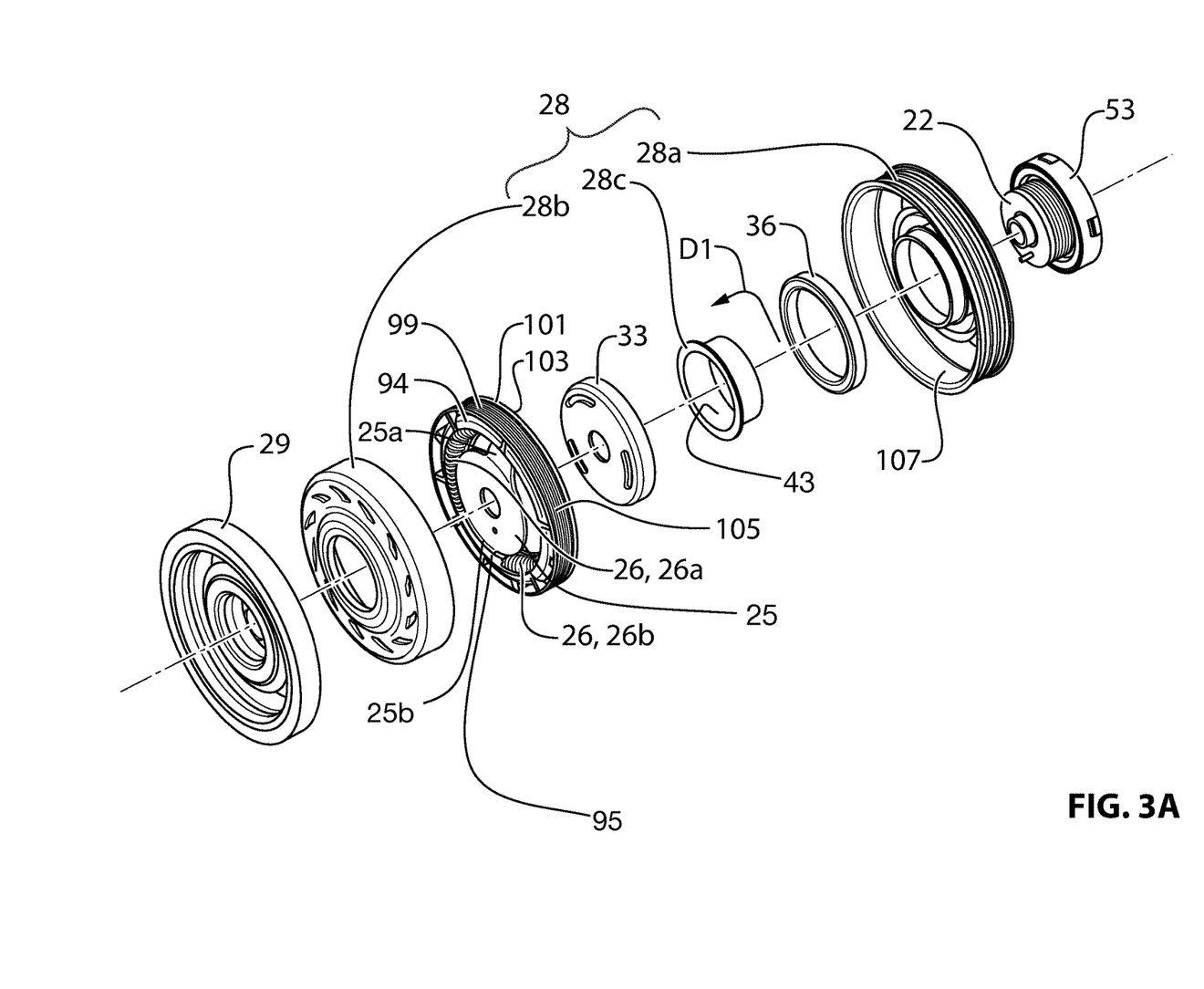
FIG. 3A is an exploded perspective view of a portion of the clutched device shown in FIG. 2.
Figure 3B:
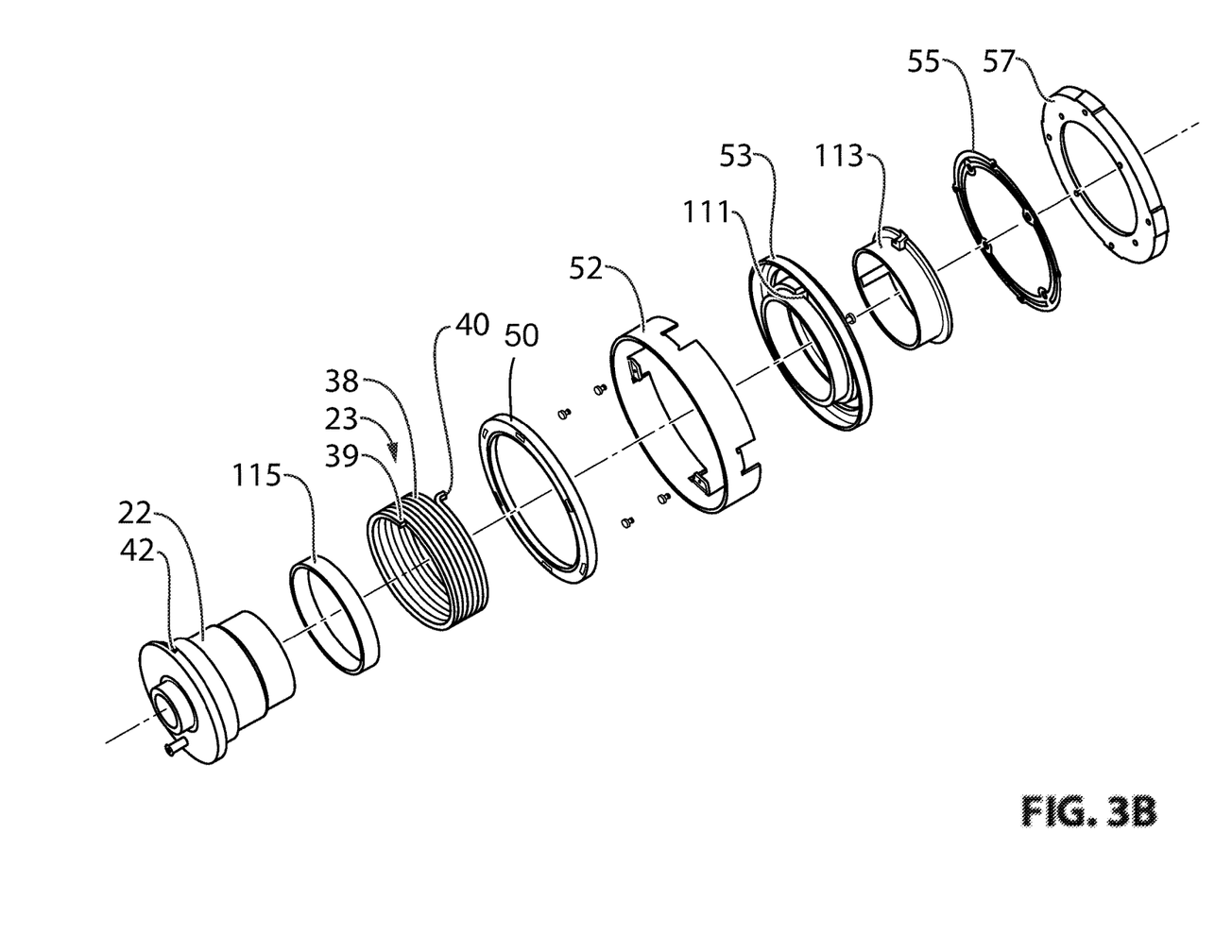
FIG. 3B is an exploded perspective view of another portion of the clutched device shown in FIG. 2.
Figure 4:
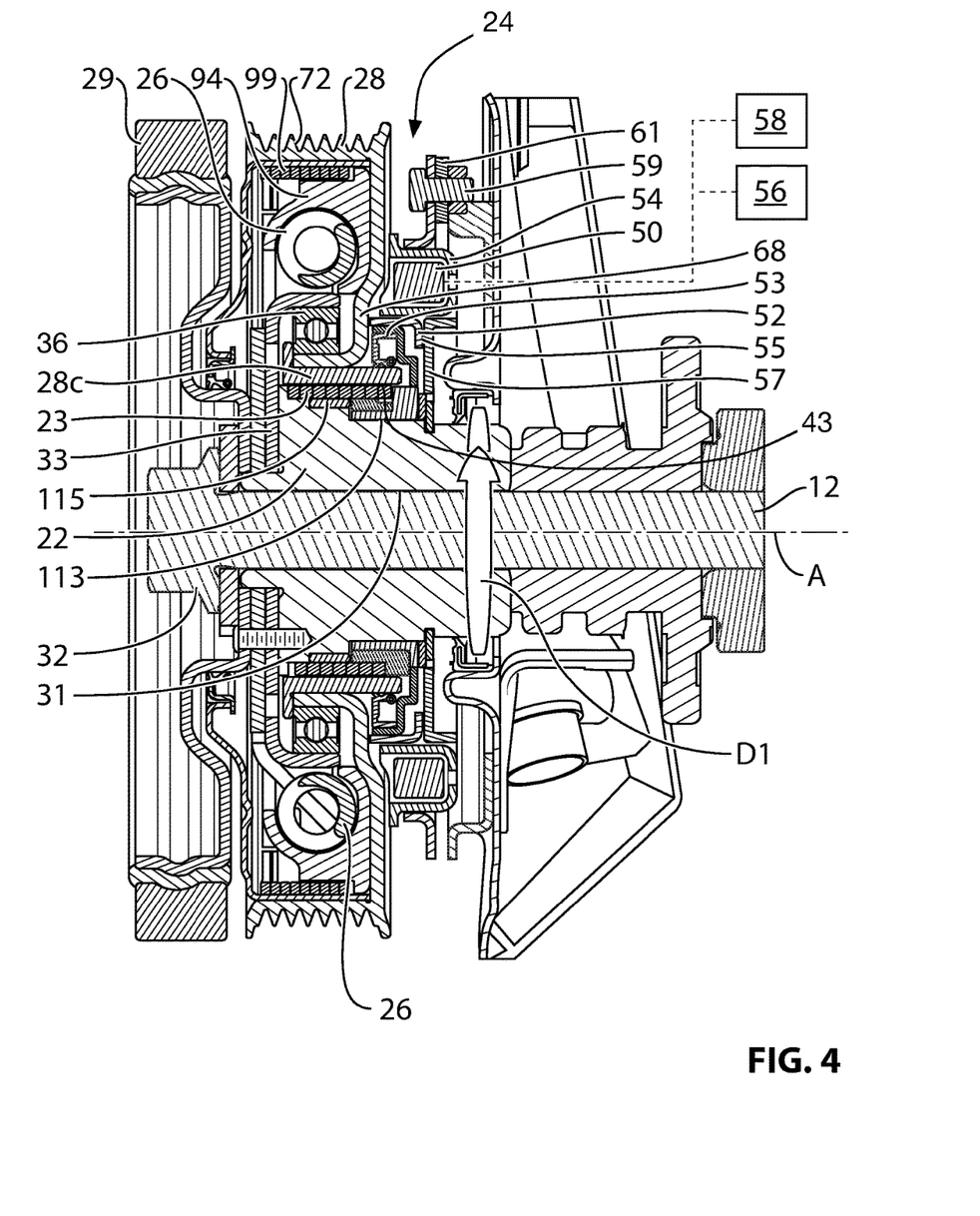
FIG. 4 is a sectional elevation view of the clutched device shown in FIG. 2.

The decoupler 20 is shown in an enlarged perspective view in FIG. 2, in a perspective exploded view in FIGS. 3a and 3b, and in a sectional elevation view in FIG. 4. As seen in FIGS. 2-4, the decoupler 20 includes a hub 22, a hub drive clutch 23 that may be referred to as a first one-way clutch, a clutch actuator assembly 24, first and second isolation springs 26 (shown individually at 26a and 26b), a decoupler pulley 28, and a pulley overrun clutch 99 that may be referred to as a second one-way clutch. Optionally, the decoupler 20 further includes a torsional vibration damper (TVD) 29.

The hub 22 may be adapted to mount to the crankshaft 12 (FIG. 1) in any suitable way. For example, the hub 22 may have an aperture 31 (FIG. 4) for a threaded fastener 32 that passes therethrough into a threaded aperture in the end of the crankshaft 12. The hub 22 defines a decoupler axis A (FIG. 4) and is rotatable about the decoupler axis A.

The hub 22 has a cup 33 fixedly connected to it. The cup 33 supports a bearing 36 that, in turn, supports the pulley 28 so as to permit relative rotation between the pulley 28 and the crankshaft 12 and hub 22. The bearing 36 may be any suitable type of bearing, such as a single row ball bearing. Alternatively any other suitable means of supporting the pulley 28 for rotation relative to the hub 22 may be used.

The isolation springs 26 elastically deform to isolate the endless drive member 14 and the crankshaft 12 from vibrations or other sudden changes in torque in one another. In the specific embodiment shown, the isolation springs 26 transfer force between the hub 22 and the pulley 28 via arms 25a on a driver 25 that is fixedly mounted to the hub 22 and axially overlapping internal lugs 95 on a spring shell 94, and via a spring shell 94. Such means for transferring torque from a hub into arcuate compression springs such as springs 26, and from arcuate compression springs into a spring shell are well known in the art.

The springs 26 in the examples shown are arcuate, helical coil compression springs made from any suitable material such as spring steel. However, any other suitable type of springs could be used, such as, for example, closed cell foam or PTU springs. The springs 26 operate in parallel. A single isolation spring 26 may be provided, or three or more springs 26 instead of the two springs 26 shown.

The spring shell shown at 94 which may be polymeric may be provided so as to prevent contact between the radially outer surface of the springs 26 and the inner surface of the pulley 28. Optionally, the isolation springs 26 may be preloaded so as to help keep all the components engaged at least when the clutched device 20 is in a home position.

The spring shell 94 may constitute an intermediate member between the hub 22 and the pulley 28, and is operatively connected to the pulley 28 via a pulley overrun clutch 99, which may be, as shown, a wrap spring clutch that has a first helical end 101 that engages a spring shell engagement surface 103 on the spring shell 94, and that has an outer surface 105 that engages a radially inner surface 107 of the pulley 28, which may be referred to as a pulley overrun clutch engagement surface 107.

The pulley 28 is supported for rotation relative to the crankshaft 12 via the bearing 36 and is engageable with the belt 14. The pulley 28, in the embodiment shown has a belt engagement surface 72 that is configured to engage a poly-V groove belt. The pulley 28 may be made from a plurality of elements including a main portion 28a, a cover member 28b that is connected to the main portion 28a via any suitable means, and a sleeve 28c. The pulley 28 may be made from any suitable material such as a suitable metal, such as steel.

The hub drive clutch 23 is controllable to transfer torque from the pulley 28 to the hub 22 (during rotation of the pulley 28 in a first rotational direction D1). The clutch 23 is also controllable to permit overrunning of the pulley 28 relative to the hub 22 in the first direction D1). The clutch 23 may be a one-way clutch and more specifically may be a wrap spring clutch, having a radially outer surface 38, a first helical end 39 and a second helical end 40 that is formed into a tang. The first helical end 39 of the wrap spring clutch 23 engages a first end engagement surface 42 on the shaft (FIG. 3B) for torque transfer therewith. The outer surface 38 is engageable with a radially inner surface of the pulley 28 that may be referred to as a clutch engagement surface 43 for torque transfer therewith.

The surface 43 may be referred to as a hub drive clutch engagement surface 43. The rest position of the wrap spring clutch 23 may be such that the outer surface 38 is substantially operatively disengaged from the clutch engagement surface 43. Thus, when the wrap spring clutch 23 is in the rest position during rotation of the pulley 28 relative to the hub 22, the wrap spring clutch 23 disengages the pulley 28 and the hub 22 from each other.

The clutch actuator assembly 24 includes an electromagnetic coil 50, an armature 52, an actuation body 53, an armature biasing spring 55, and a spring support 57. The electromagnetic coil 50 is mounted in a coil housing 54 that is itself mountable (e.g. via threaded fasteners 59) to a stationary surface 61 such as a portion of a mounting bracket for the engine 10. The coil 50 is connected to a control system 56 and to a power source 58. The power source 58 may be any suitable power source such as the vehicle battery.

The biasing spring 55 urges the armature 52 away from the pulley 68 to assist in separating the armature 52 from the pulley 28 when power to the coil 50 is cut. The spring support 57 is mounted to a stationary structure such as the aforementioned mounting bracket.

Energization of the coil 50 draws the armature 52 axially into engagement with a wall 68 of the pulley 28. The armature 52 is rotationally connected to the actuation member 53, which is, in turn rotationally connected to the second end 40 of the wrap spring clutch 23 (e.g. by means of a tang aperture 111 on the actuation member 53 that receives the tang at the second end 40 of the wrap spring clutch 23. Friction of the armature 52 against the pulley wall 68 drives the second end 40 of the wrap spring clutch 23 rotationally relative to the first end 39, in a direction which causes radial expansion of the wrap spring clutch 23 so as to engage the surface 43 on the pulley 28, thereby operatively connecting the pulley 28 to the hub 22. This is useful for when it is desired to 'warm-start' the vehicle (when the vehicle's engine is to be started again after having been stopped momentarily at a stop light as a fuel saving measure). In such a situation the MGU 18 (FIG. 1) is operated as a motor and drives the belt 14, which, in turn, drives the pulley 28.

Deenergization of the coil 50 reduces or eliminates the friction between the armature 52 and the pulley wall 68. The armature 52 is assisted in separating from the wall 68 by the biasing member 55, as noted above. The clutch 23 may remain engaged however between the pulley 28 and the hub 22, until such time that the hub 22 overruns the pulley 28, at which point the wrap spring clutch 23 will return to its rest position and operatively disconnect the pulley 28 from the hub 22.

It will be noted that when the pulley 28 drives the hub 22, the torque transfer bypasses the isolation springs 26. This is because the pulley overrun clutch 99 will operate in an overrun condition when the pulley 28 rotates in the first rotational direction D1.

A suitable bushing is shown at 113, so as to facilitate relative rotational movement of the actuation member 53 with respect to the hub 22.

A slip ring 115 is provided so as to inhibit binding of the wrap spring clutch 23 during operation.

While the pulley overrun clutch has been shown to be a wrap spring clutch it may be any other suitable kind of one way clutch.

Figure 5:
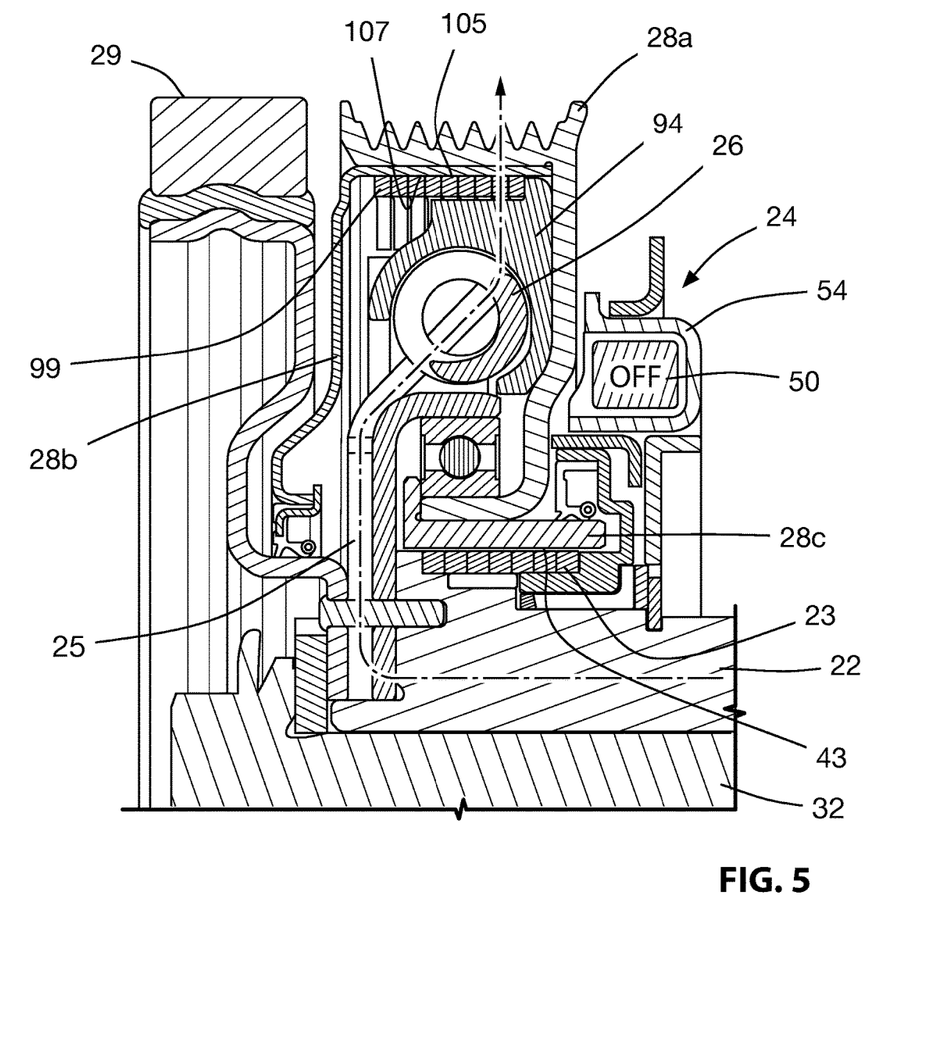
FIG. 5 is a magnified sectional elevation view of the clutched device shown in FIG. 2, showing a particular torque path through the clutched device.
Figure 6:
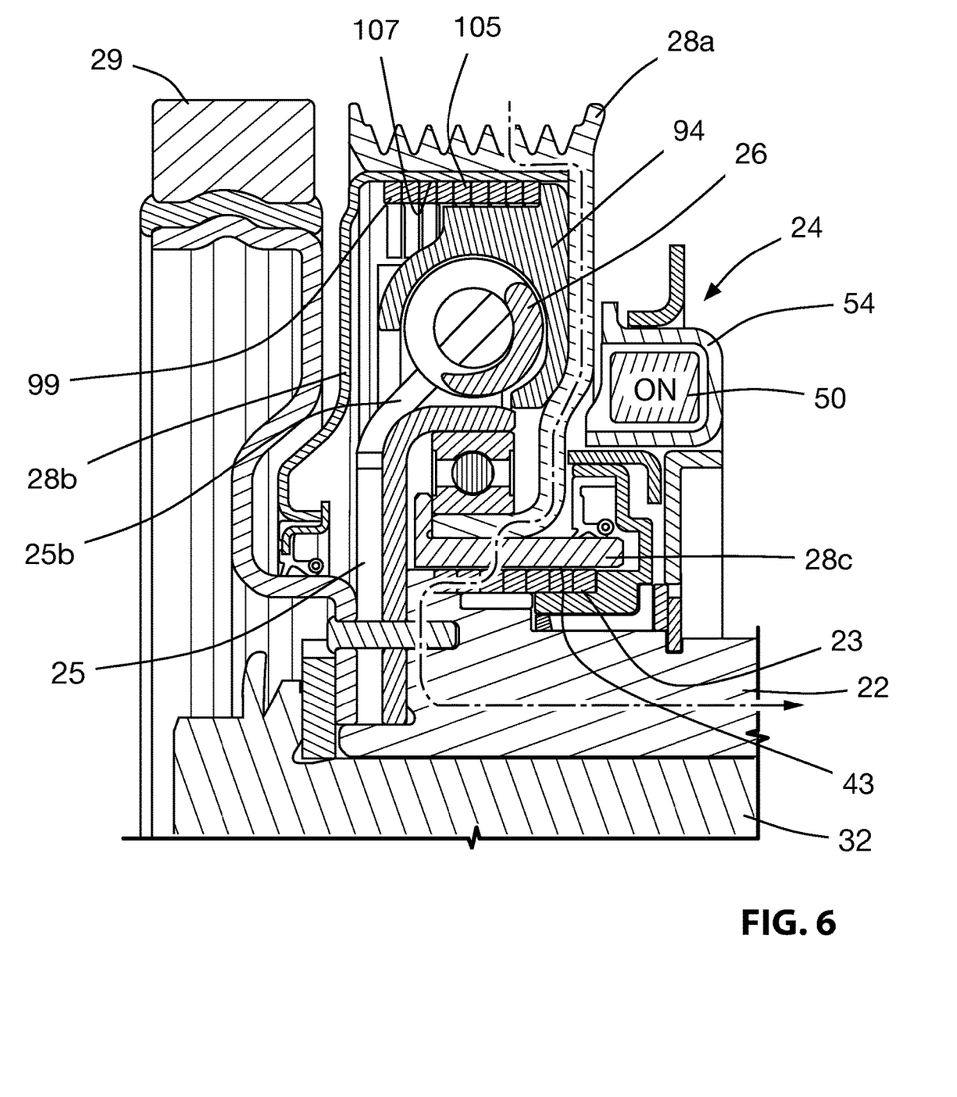
FIG. 6 is a magnified sectional elevation view of the clutched device shown in FIG. 2, showing another torque path through the clutched device.

FIG. 5 shows the torque transfer path (from hub 22 to driver 25, to springs 26, to spring shell 94, to clutch 99 to pulley 28) during normal driving. FIG. 6 shows the torque path (from pulley 28 to clutch 23 to hub 22) during boosting of the engine by the MGU 18. Some torque will also be transferred through the armature 52 and actuation member 53 which is engaged with the tang at end 40 of the clutch 23. Torque transfer during a warm start (after stopping at a stoplight momentarily) will be similar to FIG. 6. Torque transfer during a 'cold start' (using the engine's starter motor (not shown) may be similar to FIG. 5).

Those skilled in the art will understand that a variety of modifications may be effected to the embodiments described herein without departing from the scope of the appended claims.

The invention claimed is:
1. A clutched device, comprising:
a hub defining an axis and connectable to a rotatable shaft of a rotary device;
a pulley that is rotatable relative to the hub and that is engageable with an endless drive member;

an isolation spring that operatively connects the hub to the pulley when the hub drives the pulley in a first rotational direction;
a hub drive clutch that is a wrap spring clutch and that is controllable to operatively connect the pulley to the hub for driving the hub in a first rotational direction; and
a pulley overrun clutch that permits the pulley to overrun the hub in the first rotational direction.

2. A clutched device as claimed in claim 1, wherein the pulley overrun clutch is a one-way clutch that permits torque transfer from the hub to the pulley in the first rotational direction, wherein the isolation spring operatively connects the hub to the pulley through the pulley overrun clutch.

3. A clutched device as claimed in claim 1, further comprising a clutch actuator assembly that is operatively connected to the wrap spring clutch, wherein the clutch actuator assembly includes an electromagnetic coil and an armature,
wherein the wrap spring clutch has a first end and a second end, and wherein the armature is rotationally connected to the second end of the wrap spring,
wherein energization of the electromagnetic coil draws the armature axially into engagement with a wall to cause friction of the armature with the wall, so as to drive the second end of the wrap spring clutch rotationally relative to the first end, to operatively connect the pulley and the hub.

4. A clutched device as claimed in claim 3, wherein the first end is connected to the hub and the wall is a wall of the pulley.

5. A clutched device as claimed in claim 3, wherein the clutch actuator assembly further includes an armature biasing spring that urges the armature away from the wall.

6. A clutched device as claimed in claim 1, wherein the isolation spring is one of a plurality of arcuate compression springs.

7. A clutched device as claimed in claim 6, wherein the arcuate compression springs are positioned in a spring shell, and wherein the clutched device further includes a pulley overrun clutch acting between the spring shell and the pulley.

8. A clutched device as claimed in claim 1, wherein the pulley overrun clutch is a wrap spring clutch.

9. A clutched device, comprising:
a hub defining an axis and connectable to a rotatable shaft of a rotary device;
a pulley that is rotatable relative to the hub and that is engageable with an endless drive member;
an isolation spring that operatively connects the hub to the pulley when the hub drives the pulley in a first rotational direction;
a hub drive clutch that is a wrap spring clutch and that is controllable to operatively connect the pulley to the hub for driving the hub in a first rotational direction;
a clutch actuator assembly that is operatively connected to the wrap spring clutch, wherein the clutch actuator assembly includes an electromagnetic coil and an armature,
wherein the wrap spring clutch has a first end and a second end, and wherein the armature is rotationally connected to the second end of the wrap spring,
wherein energization of the electromagnetic coil draws the armature axially into engagement with a wall to cause friction of the armature with the wall, so as to drive the second end of the wrap spring clutch rotationally relative to the first end, to operatively connect the pulley and the hub.

10. A clutched device as claimed in claim 9, wherein the first end is connected to the hub and the wall is a wall of the pulley.

11. A clutched device as claimed in claim 9, wherein the clutch actuator assembly further includes an armature biasing spring that urges the armature away from the wall.

12. A clutched device as claimed in claim 9, wherein the isolation spring is one of a plurality of arcuate compression springs.

13. A clutched device as claimed in claim 9, wherein the arcuate compression springs are positioned in a spring shell, and wherein the clutched device further includes a pulley overrun clutch acting between the spring shell and the pulley.

* * * * *